United States Patent [19]

Buckle et al.

[11] 4,262,281

[45] Apr. 14, 1981

[54] PROCESSING OF INFORMATION

[75] Inventors: Derek Buckle; Timothy D. Strand, both of Dorset, England

[73] Assignee: Quest Automation Limited, Dorset, England

[21] Appl. No.: 43,596

[22] Filed: May 29, 1979

[30] Foreign Application Priority Data

May 31, 1978 [GB] United Kingdom ............... 25935/78

[51] Int. Cl.³ .............................................. G06K 9/22
[52] U.S. Cl. ................... 340/146.3 SY; 178/18
[58] Field of Search ........................... 178/18, 19; 340/146.3 SY, 146.3 SG, 146.3 AC, 146.3 MA

[56] References Cited

U.S. PATENT DOCUMENTS

| | | | |
|---|---|---|---|
| 3,487,371 | 12/1969 | Frank | 340/146.3 H |
| 3,875,331 | 4/1975 | Hasenbalg | 178/18 |
| 3,909,785 | 9/1975 | Howells | 340/146.3 SY |
| 4,005,400 | 1/1977 | Engdahl | 178/18 |
| 4,018,989 | 4/1977 | Snyder et al. | 178/18 |
| 4,035,768 | 7/1977 | Boldridge, Jr. et al. | 340/146.3 SY |
| 4,070,649 | 1/1978 | Wright, Jr. et al. | 340/146.3 SY |
| 4,128,829 | 12/1978 | Herbst et al. | 340/146.3 SY |
| 4,184,147 | 1/1980 | Seelbach | 340/146.3 SY |

Primary Examiner—Leo H. Boudreau
Attorney, Agent, or Firm—Pollock, Vande Sande & Priddy

[57] ABSTRACT

A handwriting recognition device comprises a transducer surface responsive to a pen positioned thereon for representing the coordinate position of the pen as an electrical signal, and data processing means for recognizing a handwriting effected with the pen, the data processing means including a microprocessor based control controlling a read/write memory, a non-volatile read-only memory storing a handwriting recognition routine to store recognized handwriting in the read/write memory, and an interface communicating to a host computer system a representation of the recognized character. A visual display may be provided coupled to a display interface and an input information for receiving verified recognized handwriting communicated from the host computer system. The read/write memory has a first storage location coupled to the transducer storing a representation of signals from the transducer, a second storage location coupled to the interface and storing a representation of recognized handwriting, and a third storage location coupled to the display interface and storing an image of the display.

9 Claims, 15 Drawing Figures

MEMORY MAP

| A | |
|---|---|
| O N | SCRATCH PAD AREA |
| M | RECOGNISED CHARACTER |
| L K | ORDINATE STORE |
| J | DISPLAY IMAGE |
| I H | A/D MEMORY MAPPED I/O |
| G F | RESERVED FOR FUTURE USE |
| E D | DIAGNOSTIC SOFTWARE |
| C B | ALGORITHM |
| A | |

$$\left(\frac{V_x - V\,EDGE_2}{V\,EDGE_1 - V\,EDGE_2}\right) \times K \quad \text{FIG.6}$$

FIG.7

FIG. 9A
MAIN CONTROL

FIG. 9B
RECOGNITION

FIG.9D
CHARACTER INFORMATION OUTPUT
AND UNRECOGNISED CHARACTER
INFORMATION OUTPUT

FIG. 9E
DATA INPUT

FIG.9F
FAULT MONITOR

FIG.10

PROCESSING OF INFORMATION

This invention relates to a handwriting recognition device having a transducer surface for converting handwritten characters into electrical signals. A device of this kind is described in British Patent Specification No. 1,310,683.

An object of the present invention is to provide such a device whereby the electrical signals obtained from the transducer surface are processed to communicate a digital representation of recognized handwriting to an external system, in which system the information contained in the recognized handwriting may be processed.

The present invention provides a handwriting recognition device comprising a housing containing transducer means having a surface responsive to a pen or stylus positioned thereon for representing the coordinate position of the pen or stylus in terms of an electrical signal;

and either said housing or a second separate housing containing data processing means comprising:

a read/write memory in integrated circuit form;

a non-volatile read-only memory in integrated circuit form and storing a handwriting recognition routine;

control means including a processing means arranged to interface with or to control said transducer means and to control said read/write memory, and said read only memory whereby electrical signals from said transducer means are interpreted by said routine and recognized handwriting signals are stored in said read/write memory;

and an interface communicating to an external system representations of said recognized handwriting.

The handwriting recognized by the device according to the invention may be of any form; thus handwritten characters, cursive script or signatures. Such device will commonly be arranged to recognize handwritten characters, in which case a character recognition routine of any suitable type may be employed.

The external system (normally a host computer system) may process the information in any suitable manner, depending on the intended application. The external system may communicate to said device in response to recognized characters any suitable information, for example a verified form of recognized characters, a reply signal in response to a query contained in said recognized characters, or any other appropriate response.

Thus said device may include an input interface for receiving information communicated from said external system in response to recognized characters, and a display interface for providing a display interface representation of the information received from said external system. Said input interface and said display interface may be housed with said data processing means; alternatively they may be housed in a third separate housing with a visual display.

For convenience, the recognition device according to the invention may be housed in a single housing, two separate housings where the data processing means is housed separately from the transducer means, or three separate housings where a visual display is required in a housing separate from both said transducer means and data processing means.

Said visual display may take any convenient form, for example, a vacuum fluorescent device providing a row of alphanumeric characters, a video display unit, or a printer device.

In addition, said control means in said device may, in certain circumstances, be arranged to provide directly a display representation to said display interface means, by-passing said computer system.

In addition, the device according to the invention may incorporate a certain amount of data processing capability of recognized characters, depending on the storage space available.

The transducer means may be of any suitable type, thus for example it may be formed as an array of electromagnetic coils which are coupled by an electromagnetic coupling with a coil in said pen or stylus; alternatively a capacitive coupling may be provided between the pen or stylus and an electrode grid array within the pad.

As preferred however, the transducer is of the type described in our U.S. Pat. No. 4,070,544 wherein the pressure of application of a pen or stylus to the surface of a pad results in contact being made between two electrically conductive surfaces by reason of the pressure of application of the pen or stylus to the transducer surface. An advantage of such an arrangement is that of the compactness of the transducer whereby the transducer may be mounted in a thin housing so that the housing has the thickness of a notepad of writing paper. In accordance with the present invention the data processing means included within the housing may be mounted on one or more circuit boards beneath the transducer and yet the housing remains sufficiently thin to resemble a notepad to a user writing on the device; this is important for ergonomic reasons in that a user may write on the device without being disturbed by the thickness of the device.

Preprinted forms may be provided for placing on the surface for ensuring that data is written onto the surface in a format that can readily be interpreted by the microprocessor system. As preferred, a preprinted form has a predetermined position in which a registration character may be entered; this registration character is interpreted by the microprocessor system and defines the position of the form relative to the surface so that correction factors may be calculated and subsequent data entries may be interpreted correctly.

For subsequent data entries, a datum may be generated for transmittal to the host computer system having two portions, the first portion representing the address of the position at which data entry is made and the second portion of information representing the character entered at that position.

As preferred, means are provided, described in more detail below, for normalizing the voltages provided by the transducer surface representative of the position of the stylus on the surface to prevent errors arising from offset voltages and temperature induced errors and to provide for self calibration of the transducer; such means are operative by measuring at intervals the voltages present at the edges of the surface.

A handwriting recognition routine resident in the read only memory may be of any well known type. It will be understood that the read only memory is a non-volatile memory and in accordance with current design procedures is preferably a programmable read only memory (the memory being erasable by the application of ultra-violet light). However any suitable type of ROM may be employed, e.g. a non-erasable ROM or electrically alterable ROM.

As a preferred means of processing the information from the transducer surface, a set of time sequential digital coordinate position signals representing a character are stored in a group of memory locations. The contents of such group of memory locations are subject to said routine and a character recognized by said routine from said set of coordinate positions is stored in a preselected memory location. Such character may be communicated to the host computer system and, in one mode of operation, the character may be verified by the computer system and returned to the device. A group of memory locations are reserved for characters returned from the computer system, which memory group serve to provide an image for display, the display interface periodically sampling the characters to maintain and update the display.

Preferably the information stored in the read/write memory is processed by direct memory access techniques; this is a much quicker mode of operation than arranging for a microprocessor directly to control the information storage in the read/write memory.

A preferred embodiment of the invention will now be described with reference to the accompanying drawings, wherein.

Figure 1:
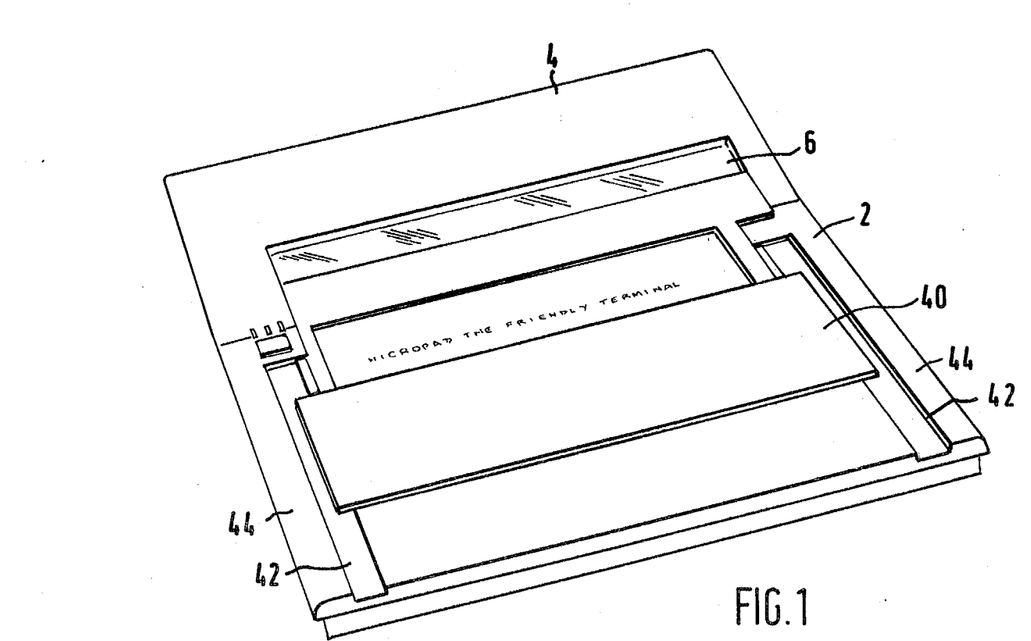
FIG. 1 is a perspective view of the handwriting recognition device according to the invention.
Figure 2:
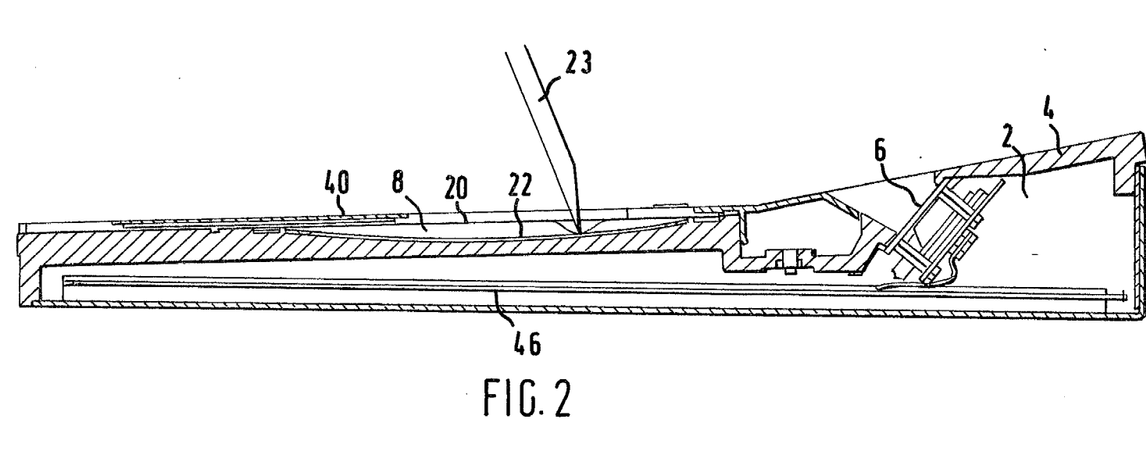
FIG. 2 is a cross sectional side view of the device.

Referring now to FIGS. 1 and 2 of the drawings, the handwriting recognition device according to the invention, described as a character recognition device, comprises a generally rectangular housing 2 having at one end a wedge-shaped enlarged portion 4. Disposed in the top surface of portion 4 is an elongate window 6 containing a vacuum fluorescent display. Disposed across the major part of the top surface of the flat part of the housing is a surface of a transducer pad 8. Such pad is of known construction and is described in U.S. Pat. No. 4,070,544 in the name of Quest Automation Limited. The pad comprises a tensioned flexible membrane having a top surface 20 exposed by housing 2 and having a lower surface with a conductive covering. The top membrane 20 is positioned adjacent but spaced from a backing member 22 having an electrically conductive coating on its upper surface whereby when a pen 23 is pressed upon the surface of the upper membrane, the two conductive surfaces make electrical contact at the point of application of the pen. This electrical contact is used as a means of detecting the position of the pen on the top surface of the pad.

Figure 4:
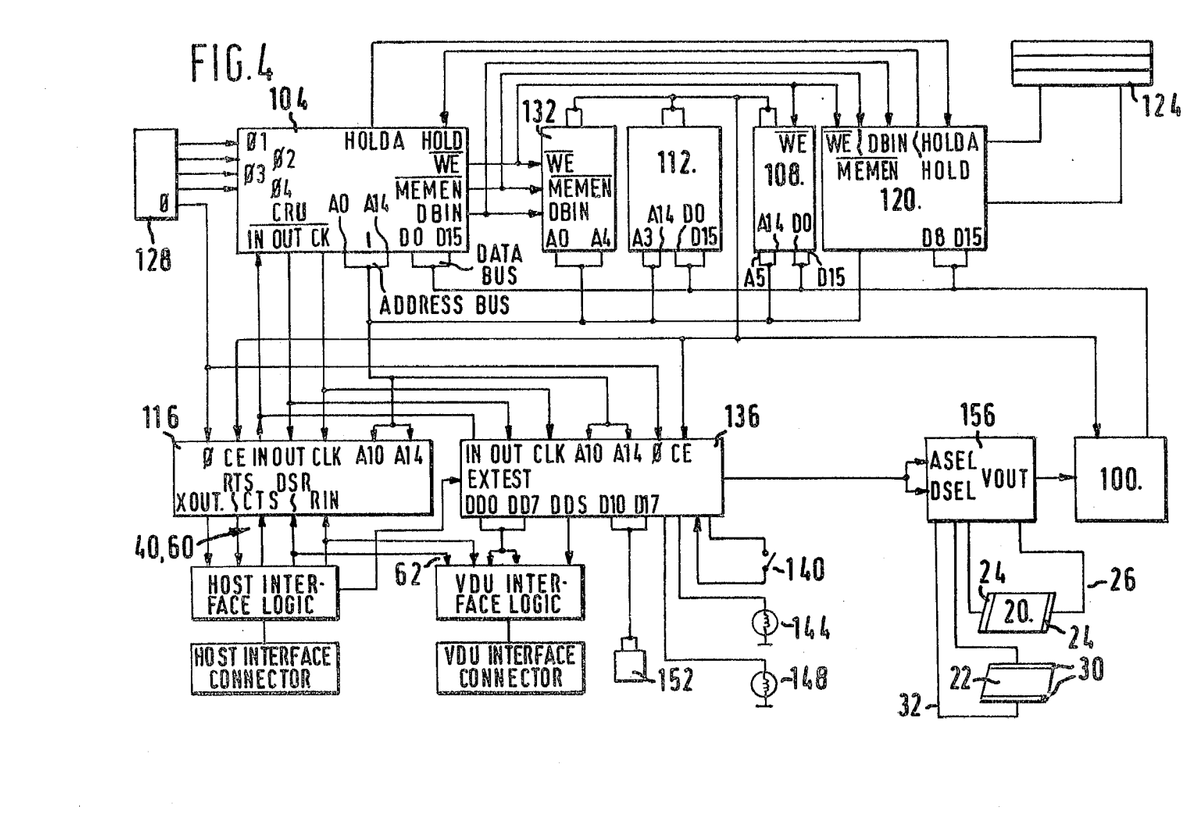
FIG. 4 is a block schematic of the components of the handwriting recognition device.

Referring to FIG. 4, the top surface 20 has at each of two opposite edges electrically conductive bars 24 connected to signal lines 26. The lower surface 22 has electrically conductive bars 30 positioned along two opposite edges, orthogonal to the bars 24 and bars 30 are connected to signal lines 32. In use, signal lines 26 and 32 are multiplexed so that in one phase of operation lines 26 are employed to energize surface 20 and lines 32 are employed to detect a voltage developed at the point of electrical contact. In the other phase of operation, lines 32 energize surface 22 via bars 30 and surface 20 is employed to detect the voltage generated at the point of electrical contact, such voltage being transmitted along line 26.

Since membrane 20 is pressure sensitive, it is undesirable for the surface of the membrane to be subject in use to pressure from the hand, when writing on the pad, which could interfere with satisfactory operation of the equipment. To provide a convenient hand-rest without touching the membrane, a handrest plate 40 is freely slidable in grooves 42 formed in side portions 44 of housing 2 and parallel with the plane of surface 20. The plate 40 is free to follow the movement of the hand down the sheet without inconvenience to the writer. This arrangement is more fully described and claimed in U.S. Pat. No. 4,129,746.

Mounted immediately beneath the transducer pad is a single printed circuit board 46 carrying the various data processing chips.

As shown in FIG. 2, despite the presence of the transducer pad superposed on printed circuit board 46, the housing 2 is still sufficiently thin across its major portion to resemble a pad of writing paper and thus a user of the pad is not inconvenienced by the thickness of the pad.

Figure 3:
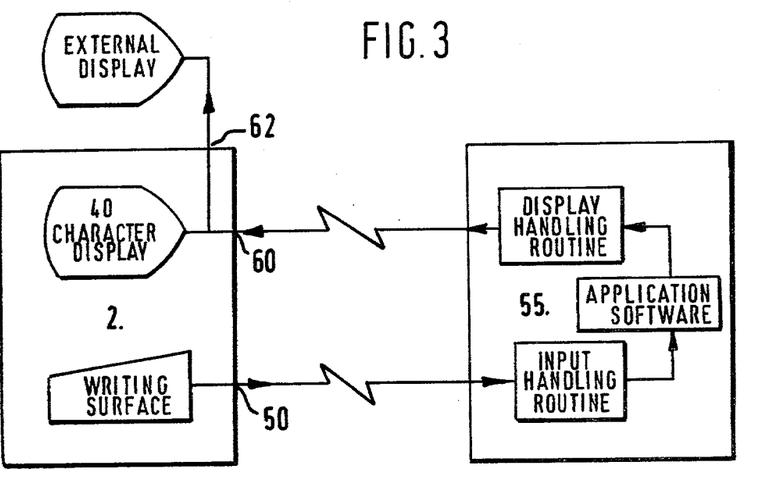
FIG. 3 is a block schematic showing the connection of the device to an associated host computer.

Referring to FIG. 3, the character recognition device 2 of FIG. 1 is arranged to provide, by means of the data processing circuits contained therein, recognized characters at a serial output port 50 for transmission to a host computer 55, for example by coupling the device 2 by a modem to a telephone line. The recognized characters are subject in the host computer 55 to an input handling routine, and an application software program is carried out. A display handling routine is provided in computer 55, and a display handling signal is supplied to a serial input port 60 of the character recognition device 2. It is preferred to provide in device 2 a serial interface chip which combines the functions of input port 60 and output port 50.

The display handling signal supplied by the host computer 55 is arranged to control display 6 via a display interface. The display may be of any suitable kind but may frequently include a verified representation of the signals recognized by device 2 and interpreted by computer 55.

The display handling signal supplied to port 60 may also be coupled via an interface connector 62 to an external VDU display.

Figure 5:
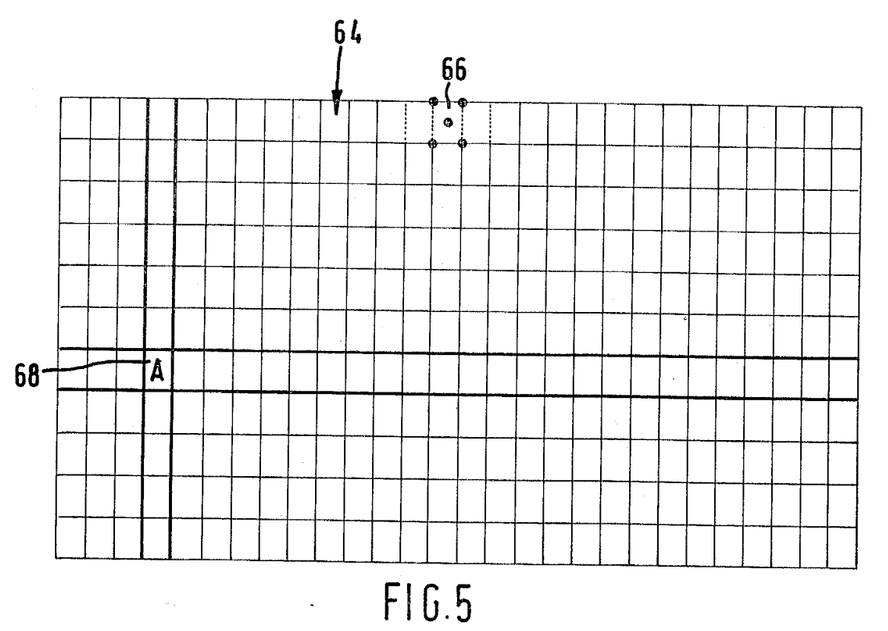
FIG. 5 is a diagram of a preprinted form for use on the transducer surface of the handwriting recognition device.

Referring to FIG. 5, preprinted forms 64 are positioned on the upper surface of pad 8 and the characters printed by a pen on the preprinted form are interpreted by the pad. As a means of aligning and registering the form on the pad a registration box 66 is provided at the top of the form. A predetermined registration character is printed by the user in registration box 66 and data processing circuits in the host computer or in the character recognition device compare the position of the registration character with a predetermined position in order to compute correction factors should the form be out of registration with a predetermined position of the form. It will be understood that the software routines for such error computation are well known.

A character subsequently entered in any other box 68 on the preprinted form will be sensed by pad 8 as a series of X, Y coordinate positions as the pad 8 is alternatively switched between energization in the X and Y directions. Each X or Y sampling is processed in an analogue to digital convertor 100 (FIG. 4) to a digital form and the digital form of the ordinate is stored in a buffer register in the convertor 100. A microprocessor 104 periodically samples the buffer register in convertor 100 and stores the ordinate in read/write memory 108 in a predetermined memory location. A series of ordinates from convertor 100 are stored in adjacent memory locations in random access memory 108 so that a representation of a character entered on the pad as a series of ordinates is stored in a group of memory locations in read/write memory 108. This group is shown as locations K-L in the memory map indicated in FIG. 8. When a character is assembled in RAM 108, a character recognition routine or algorithm (which may be of any well known type: see for example "Pattern Recognition Learning and Thought", Leonard Uhr [Prentice-Hall, Automatic Computation Series]) stored in read only memory 112 in locations A-B processes the character and is effective to recognize the character. The algorithm also from the coordinate positions of the character, computes the location of the box of the preprinted form in which the character is entered and presents this information as an address of two data portions, each portion representing a position on the X or Y coordinate axis of the box.

Figure 8:
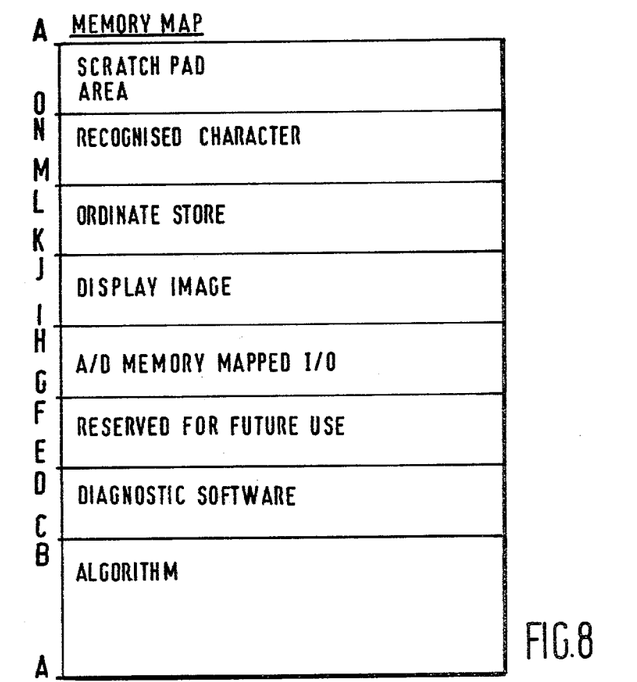
FIG. 8 is a memory map for the handwriting recognition device.

The address of the character together with the recognized form of the character are stored in a further memory location M-N in read/write memory 108. This memory location is sampled by serial interface 116 providing output port 50, and the contents of the memory location as and when the location is changed are communicated from interface 116 to host computer 55. Each character is interpreted by host computer 55. Host computer 55, among other functions, assembles a line of characters for transmittal by a display handling routine in computer 55 to the input port 60 provided by serial interface 116. The line of characters communicated to serial interface 116 are stored in memory locations I-J in memory 108. This memory location is periodically sampled by a display interface 120 for illumination of the vacuum fluorescent display 124. The display interface 120 includes latching means which serve to preserve the display image in the interface. As and when the display signal from the host computer is up-dated, the memory location I-J within RAM containing an image of the display is refreshed and when the interface next samples the memory location, the display is correspondingly updated.

It will be understood that the host computer need not necessarily reply to the character recognition device with an 'echo' of the characters transmitted from the device; since the writing surface and character display are logically separate devices, the host computer may be arranged to provide any suitable display in dependence on the information transmitted to the host computer from the device 2.

The circuitry contains a standard clock generator 128, a chip select 132 and a parallel interface 136. Parallel interface 136 serves to couple to the microprocessor system a transducer surface on/off switch 140, a transducer surface on/off indicator 144, and a document registered indicator 148. Interface 136 also serves to connect an option select 152, which serves to determine the link speed for the communication link with the host computer, the number of stop bits and parity bits in data transmitted across the host link, etc. Parallel interface 136 also couples a switch matrix multiplexor 156 which is arranged so as in alternate phases of operation to energize surface 22 via lines 32 and arrange that surface 20 serves to detect the voltage at the point of contact between the surfaces, and in the other phase of operation to energize surface 20 via lines 26 and to arrange that surface 22 detects the voltage existing at the point of contact between the two surfaces.

Parallel interface 136 also serves to connect a VDU (separate from the transducer device) if and when required.

Figure 6:
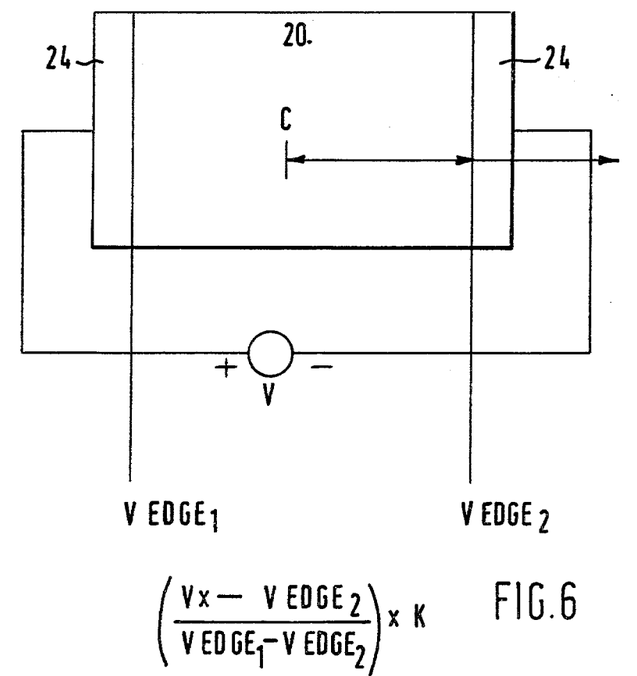
FIGS. 6 and 7 are diagrams illustrating a means of normalizing voltages detected from the transducer surface.
Figure 7:
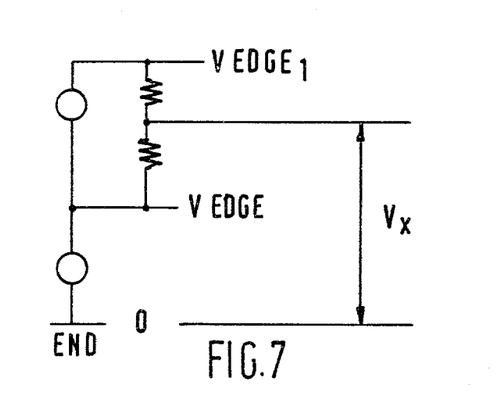

As a means of ensuring that the electrical representations of characters written onto the transducer device are free from errors arising from temperature variations, offset voltages etc., a means is provided of normalizing the voltage detected by the transducer surface. Such means comprises sampling at periodic intervals, say once every hundred samplings of the character coordinates, the voltages existing at the edges of the conductive surfaces of the transducer by actuation of switches with switch matrix 156. Referring to FIGS. 6 and 7 this arrangement is shown schematically with the voltages existing at the edges of the conductive surfaces being represented by $V_{edge\,1}$ and $V_{edge\,2}$. The microprocessor system is arranged to carry out a computation to normalize the voltage $V_X$ representing a coordinate position of contact, the normalized voltage being represented by $(V_X - V_{edge\,2})/V_{edge\,1} - V_{edge\,2}) \times K$.

Figure 9A:
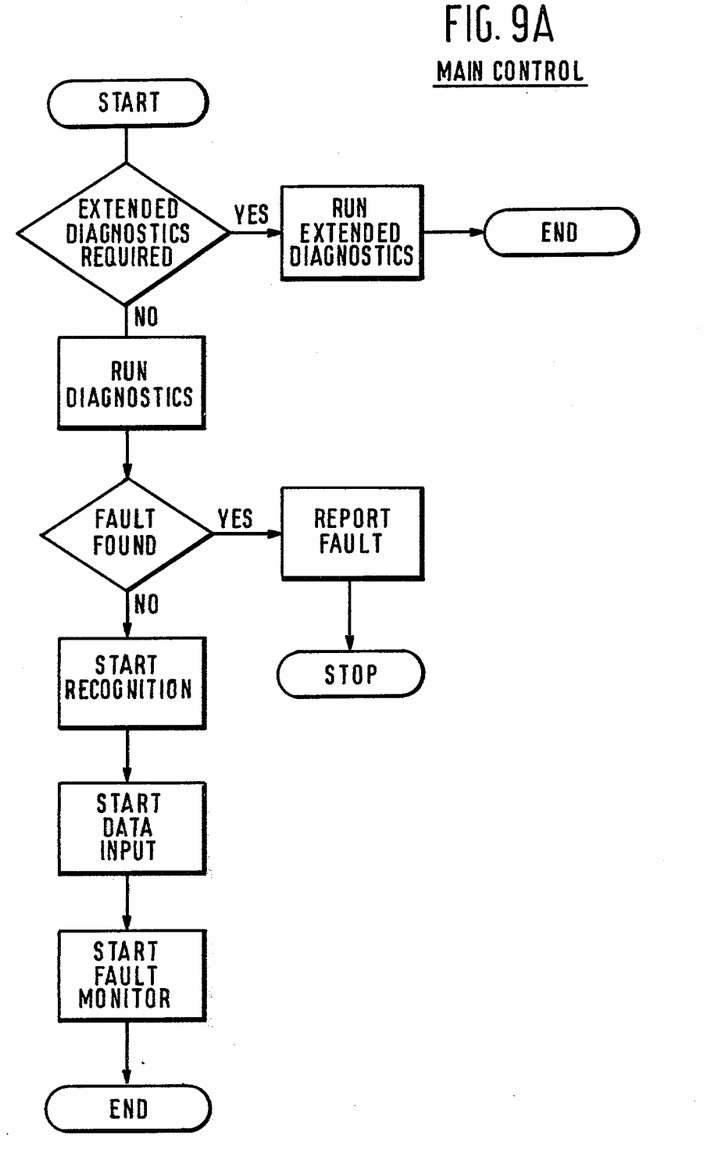
FIGS. 9A-9F are flow charts of the control routines of the device.
Figure 9B:
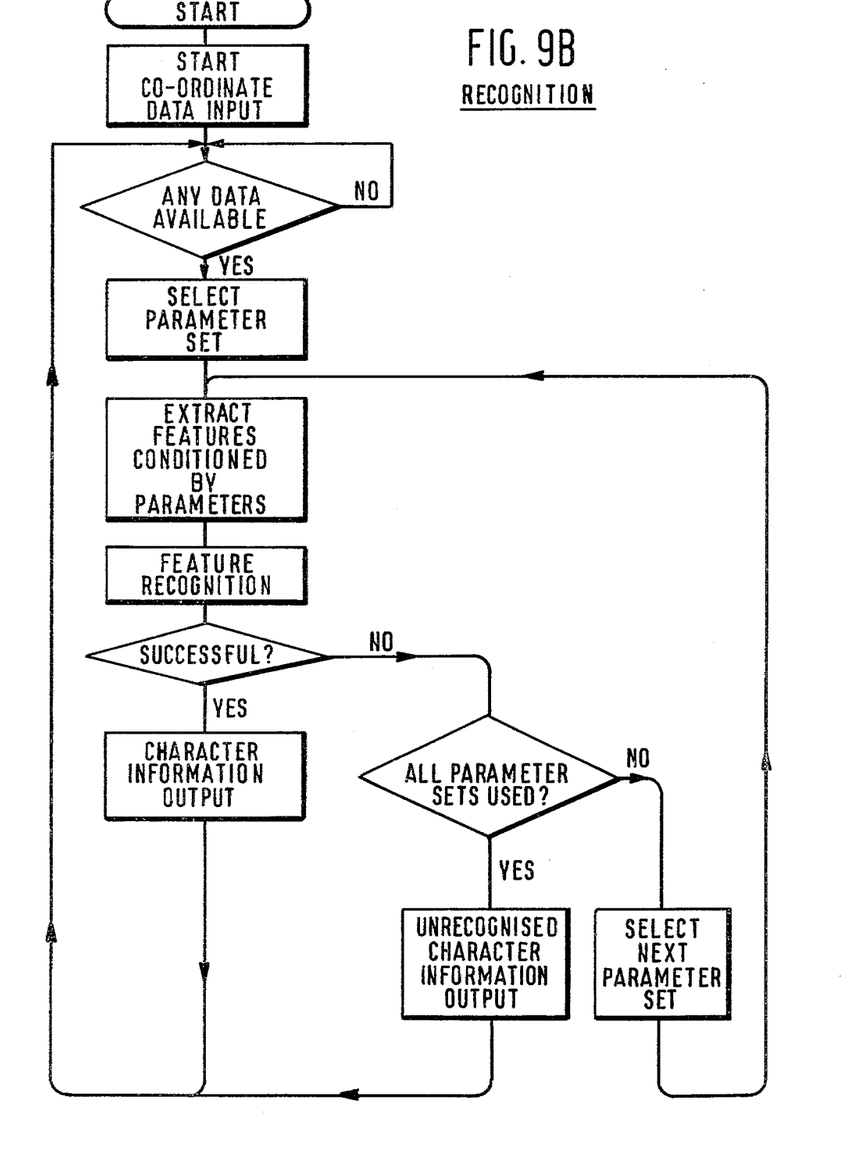
Figure 9C:
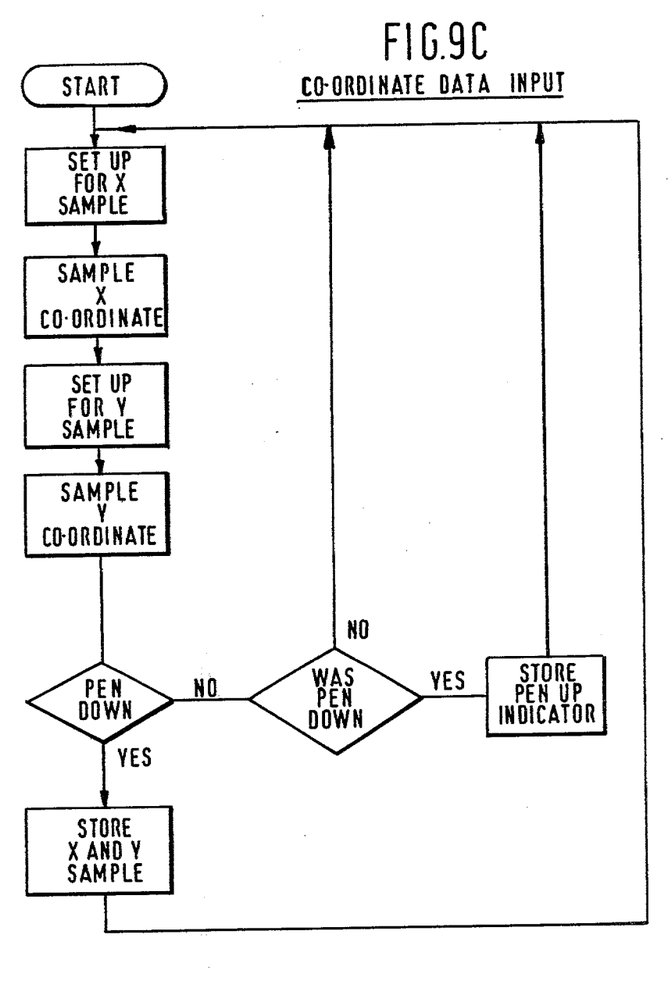

The software control routines for carrying out the functions described above are shown in FIGS. 9A-9F. Referring to FIG. 9A, the first part of the program is taken up with diagnostic routines; such routines are well known and it is not thought necessary to describe in detail such routines. If no fault is found, the recognition process is started; the recognition routine is shown in FIG. 9B. The first part of the recognition routine is taken up with assembling data from the transducer in memory locations K-L; this is shown in more detail in FIG. 9C. As shown in FIG. 9C, X and Y ordinates are sequentially sampled and are stored, provided the transducer registers that the pen is in a 'pen down' position, i.e., with the pen in contact with the transducer surface.

Figure 9D:
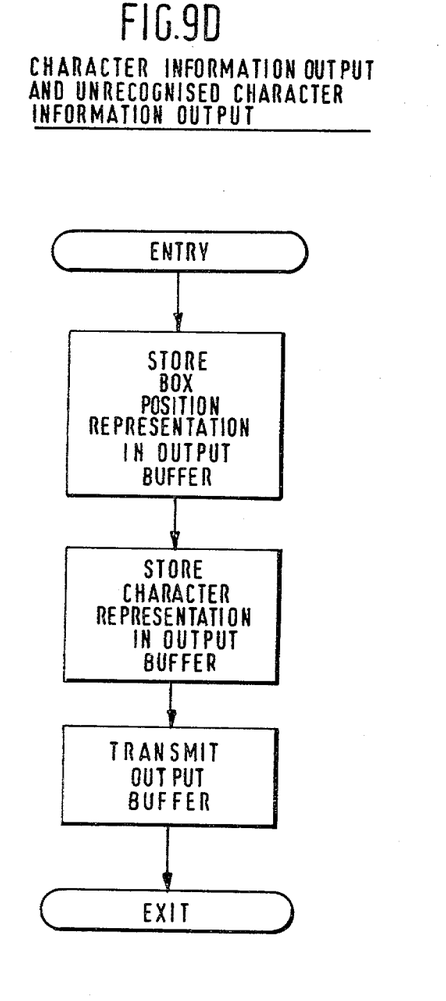

When data has been collected for a character entered on the transducer surface, the data is processed as shown in FIG. 9B in order to recognize the character. The character recognition routine determines a set of parameters of the input data to be selected, and such parameters are extracted from the input data. A feature recognition test is carried out and if successful, a recognized character output routine, FIG. 9D is carried out, in which the recognized character together with a calculated address of the character on the preprinted form, is stored in an output buffer.

If the feature recognition test is unsuccessful, a further set of preselected parameters is selected and the value of such parameters from the input data is determined. If all the sets of parameters of the recognition routine are used and the character remains unrecognized, the output routine of FIG. 9D is employed, with the fact that the character remains unrecognized being transmitted to the host computer system.

Figure 9E:
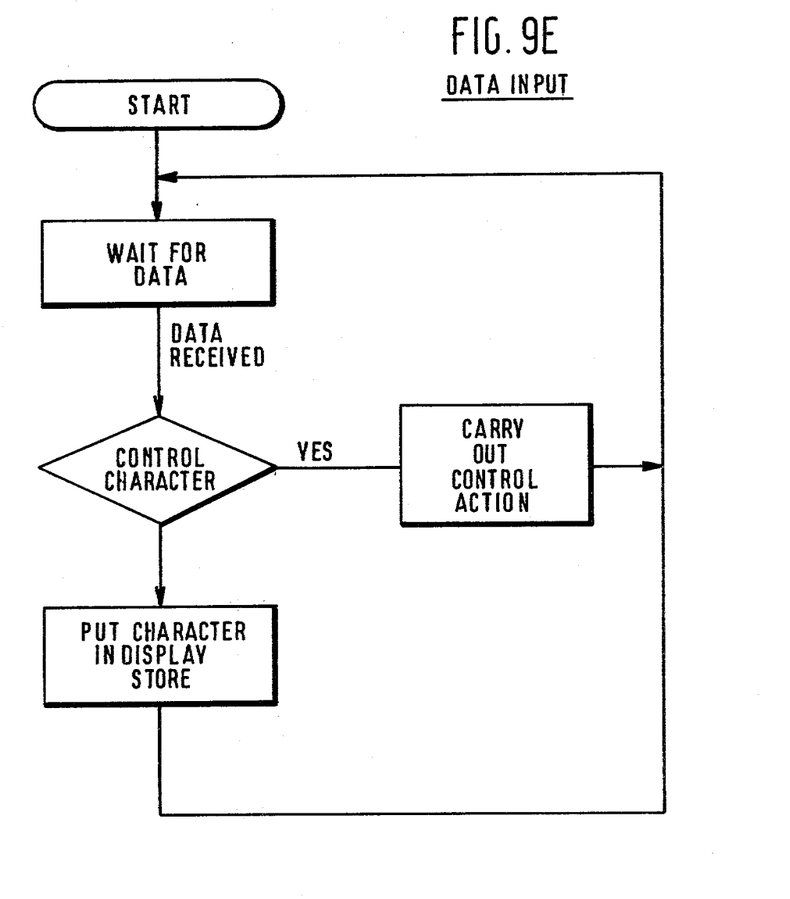

Information transmitted to the host computer system results in data being sent from the host computer system to the character recognition device, where it is subject to data input routine as shown in FIG. 9E, where characters are stored in display memory locations I-J.

Figure 9F:
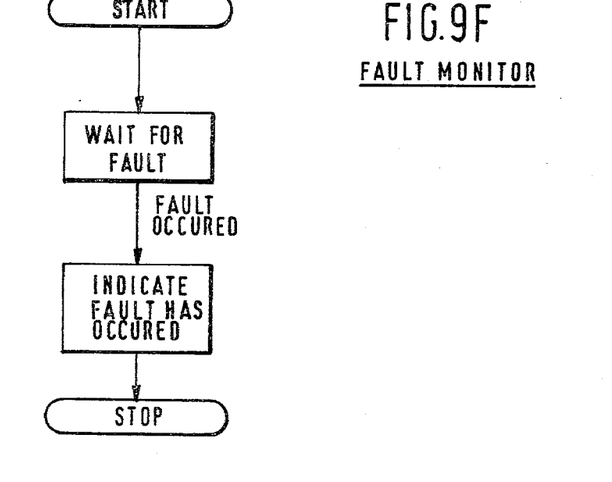

Following the data input routine, a fault monitor routine as shown in FIG. 9F is initiated.

Figure 10:
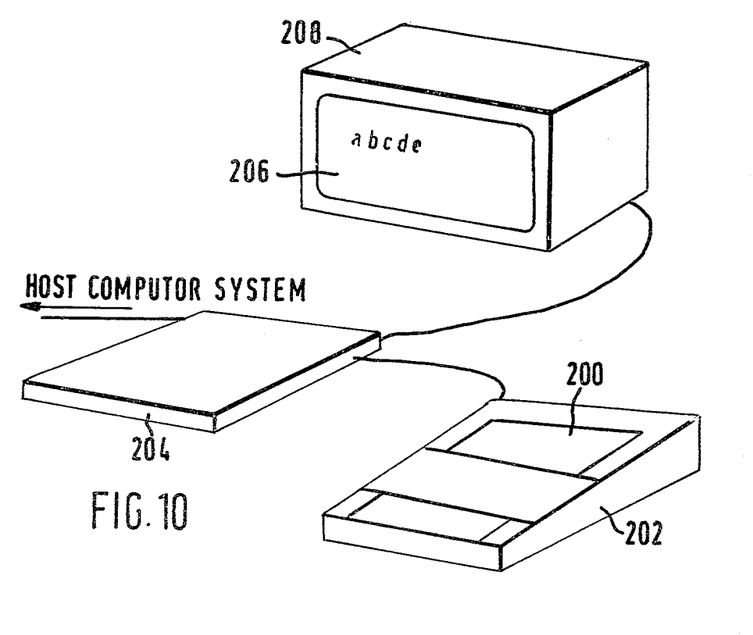
FIG. 10 is a schematic view of the device according to the invention housed in three separate housings.

Referring now to FIG. 10, the character recognition device according to the invention is shown as housed in three separate housings. This is for convenience of use and of storage. Thus a transducer pad 200 is housed in a housing 202 and connected to a housing 204 containing data processing circuitry. The data processing circuitry is coupled to a host computer system and to a display 206, formed as a video display unit, housed in a housing 208.

Thus there has been described a handwritten character recognition device which is particularly suited to interfacing with a host computer system and which carries out all necessary character identification processes within the device.

We claim:

1. A handwriting character recognition device comprising a single housing containing transducer means having a surface, responsive to a pen or stylus positioned thereon, for producing the coordinate position of the pen or stylus in terms of an electrical signal;

said single housing also containing data processing means comprising:

a read/write memory in integrated circuit form, a further memory in integrated circuit form for storing a handwriting recognition routine, control means including a processing means arranged to interface with or to control said transducer means and to control said read/write memory and said further memory whereby electrical signals from said transducer means are interpreted by said routine and recognized handwriting signals are stored in said read/write memory, and an interface for communicating with an external system representations of said recognized handwriting.

2. A device according to claim 1, including an input interface for receiving information communicated from said external system in response to said recognized handwriting, and a display interface for providing a display representation of the information received from said external system.

3. A device according to claim 2, wherein said input interface and said display interface are housed.

4. A display as claimed in claim 2, wherein said read/write memory has a storage location coupled to said display interface and storing an image in digital form of the display required, said external system being arranged to update said image at intervals and said display interface being arranged to sample said image at intervals.

5. A device according to claim 1, wherein the read/write memory has a first storage location coupled to said transducer for storing a representation of digital coordinate position signals representing a handwritten character, and a second storage location coupled to said interface for storing a representation of a character recognized by said routine.

6. A device as claimed in claim 5, wherein said second storage location is arranged to store a two portion data, one portion representing said recognized character and the other portion representing the position of said character on said surface.

7. A device as claimed in claim 1, wherein said handwriting recognition routine is a character recognition routine operative to examine as an iterative process, preselected parameters of signals from said transducer means in order to recognize a character.

8. A device as claimed in claim 1, wherein said processing means is arranged to carry out a voltage normalization for normalizing the voltage sensed by said transducer, including means for determining at intervals the voltages $V_{edge\ 1}$ and $V_{edge\ 2}$ existing at the edges of the surface and a normalized voltage $V_{xn}$ such that $$V_{xn} = (V_X - V_{edge\ 2})/(V_{edge\ 1} - V_{edge\ 2})K,$$

K being a constant having dimension of voltage and $V_X$ being the voltage detected at the position of said pen or stylus on said pad.

9. A device according to claim 1 including means for determining the alignment and registration of a form, provided with a registration character, placed on the surface of said transducer means, said last-named means comprising a data processing circuit arranged to receive data corresponding to signals generated by the overprinting of said registration character by a user, and operative to compare said data with predetermined registration character position data, and to compute correction factors to be applied to other characters printed thereafter on the form by the user if the form is not positioned in correct alignment and registration on the surface.

* * * * *